United States Patent
Yanagida et al.

(10) Patent No.: US 9,487,213 B2
(45) Date of Patent: Nov. 8, 2016

(54) VEHICLE CONTROL DEVICE

(75) Inventors: Tomoaki Yanagida, Susono (JP); Shuji Moriyama, Susono (JP); Takuro Morino, Susono (JP); Hitoshi Matsunaga, Anjo (JP); Yuji Hattori, Gotemba (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/982,290

(22) PCT Filed: Feb. 1, 2011

(86) PCT No.: PCT/JP2011/052023
§ 371 (c)(1),
(2), (4) Date: Jul. 29, 2013

(87) PCT Pub. No.: WO2012/104993
PCT Pub. Date: Aug. 9, 2012

(65) Prior Publication Data
US 2014/0019021 A1    Jan. 16, 2014

(51) Int. Cl.
| B60W 10/02 | (2006.01) |
| B60W 10/11 | (2012.01) |
| B60W 30/18 | (2012.01) |
| B60W 10/06 | (2006.01) |
| B60W 10/107 | (2012.01) |

(52) U.S. Cl.
CPC ........ B60W 30/18109 (2013.01); B60W 10/02 (2013.01); B60W 10/06 (2013.01); B60W 10/107 (2013.01); B60W 10/11 (2013.01); B60W 30/18072 (2013.01); *B60W 2030/1809* (2013.01); *B60W 2600/00* (2013.01); *B60W 2710/1005* (2013.01); *B60W 2710/1038* (2013.01)

(58) Field of Classification Search
CPC .................. B60W 10/107; B60W 2710/023; B60W 30/18136
USPC .............................................. 477/47; 701/54
See application file for complete search history.

(56) References Cited

U.S. PATENT DOCUMENTS

| 4,680,987 | A * | 7/1987 | Morimoto ....................... 477/39 |
| 6,371,883 | B1 * | 4/2002 | Eguchi .................. B60K 6/365 477/107 |
| 6,672,981 | B2 * | 1/2004 | Inoue ................ F16H 61/66259 474/18 |

(Continued)

FOREIGN PATENT DOCUMENTS

| JP | 8-121203 | 5/1996 |
| JP | 2006-300141 | 11/2006 |

*Primary Examiner* — John R. Olszewski
*Assistant Examiner* — Jean-Paul Cass
(74) *Attorney, Agent, or Firm* — Finnegan, Henderson, Farabow, Garrett & Dunner, LLP (57) ABSTRACT

A vehicle control device includes an engine that is a power source of a vehicle, a transmission configured to connect the engine to a drive wheel of the vehicle, and a clutch configured to connect or block transmission of power between the engine and the drive wheel through the transmission. The vehicle control device is capable of executing predetermined control to allow the vehicle to travel while stopping supplying fuel to the engine and releasing the clutch that has been engaged, during travel of the vehicle, and the vehicle control device downshifts the transmission at the time the clutch is released in the predetermined control. It is possible to shift the transmission into a lowest-speed side gear ratio by the downshift.

7 Claims, 3 Drawing Sheets

(56) References Cited

U.S. PATENT DOCUMENTS

| | | | | |
|---|---|---|---|---|
| 6,730,000 B1* | 5/2004 | Leising | B60W 10/06 477/110 |
| 7,140,460 B2* | 11/2006 | Shimizu | B60K 6/44 180/243 |
| 8,696,515 B2* | 4/2014 | Yamada et al. | 477/47 |
| 2004/0009842 A1* | 1/2004 | Inada | 477/5 |
| 2005/0090365 A1* | 4/2005 | Tamai et al. | 477/5 |
| 2007/0072737 A1* | 3/2007 | Dickinson | B60W 10/02 477/176 |
| 2007/0205735 A1* | 9/2007 | Kiuchi | B60K 6/365 318/432 |
| 2008/0083579 A1* | 4/2008 | Okuda et al. | 180/293 |
| 2011/0277577 A1* | 11/2011 | Roberge et al. | 74/473.1 |

* cited by examiner

VEHICLE CONTROL DEVICE

CROSS-REFERENCE TO RELATED APPLICATIONS

This application is a national phase application of International Application No. PCT/JP2011/052023, filed Feb. 1, 2011, the content of which is incorporated herein by reference.

FIELD

The present invention relates to a vehicle control device.

BACKGROUND

Conventionally, technology to automatically stop an engine in a vehicle is suggested. Patent Literature 1 discloses technology of a hybrid vehicle provided with an engine and a clutch, which selectively transmits/blocks a driving force from the engine to a drive wheel, for stopping the engine and releasing the clutch when an accelerator opening degree reaches 0.

CITATION LIST

Patent Literature

Patent Literature 1: Japanese Patent Application Laid-open No. H08-121203

SUMMARY

Technical Problem

Herein, when the engine is stopped and the clutch is released during travel of the vehicle, a driver might feel uncomfortable due to decrease in deceleration (deceleration failure). It is desired to inhibit the decrease in the deceleration when the clutch is released.

An object of the present invention is to provide the vehicle control device capable of inhibiting the decrease in the deceleration when the engine is stopped and the clutch is released during the travel of the vehicle.

Solution to Problem

A vehicle control device according to the present invention includes an engine that is a power source of a vehicle; a transmission configured to connect the engine to a drive wheel of the vehicle; and a clutch configured to connect or block transmission of power between the engine and the drive wheel through the transmission, wherein the vehicle control device is capable of executing predetermined control to allow the vehicle to travel while stopping supplying fuel to the engine and releasing the clutch that has been engaged, during travel of the vehicle, and the vehicle control device downshifts the transmission at the time the clutch is released in the predetermined control.

In the vehicle control device, it is preferable that the predetermined control is started according to a braking operation.

In the vehicle control device, it is preferable that the transmission is shifted into a lowest-speed side gear ratio by the downshift by the time a rotation of the engine stops at the time the clutch is released in the predetermined control.

In the vehicle control device, it is preferable that the downshift is started in synchronization with a release instruction to release the clutch in the predetermined control.

In the vehicle control device, it is preferable that a speed of the downshift is controlled at the time the clutch is released in the predetermined control.

In the vehicle control device, it is preferable that the speed of the downshift at the time the clutch is released in the predetermined control is a speed to decrease change in deceleration of the vehicle at the time the clutch is released.

In the vehicle control device, it is preferable that the speed of the downshift at the time the clutch is released in the predetermined control is based on a releasing speed at which the clutch is released.

In the vehicle control device, it is preferable that a timing at which the clutch is released and a timing at which the downshift is completed are synchronized with each other at the time the clutch is released in the predetermined control.

Advantageous Effects of Invention

The vehicle control device according to the present invention provided with the clutch, which connects or blocks the transmission of the power between the engine and the drive wheel through the transmission, is capable of executing predetermined control to allow the vehicle to travel while stopping supplying the fuel to the engine and releasing the clutch, which has been engaged, during the travel and the vehicle control device downshifts the transmission at the time the clutch is released in predetermined control. According to the vehicle control device according to the present invention, there is an effect of inhibiting the decrease in the deceleration when the engine is stopped and the clutch is released during the travel of the vehicle.

DESCRIPTION OF EMBODIMENTS

A vehicle control device according to an embodiment of the present invention is hereinafter described in detail with reference to the drawings. Meanwhile, the invention is not limited by the embodiment. The embodiment to be described includes a component easily conceived by one skilled in the art or a substantially identical component.

Embodiment

Figure 1:
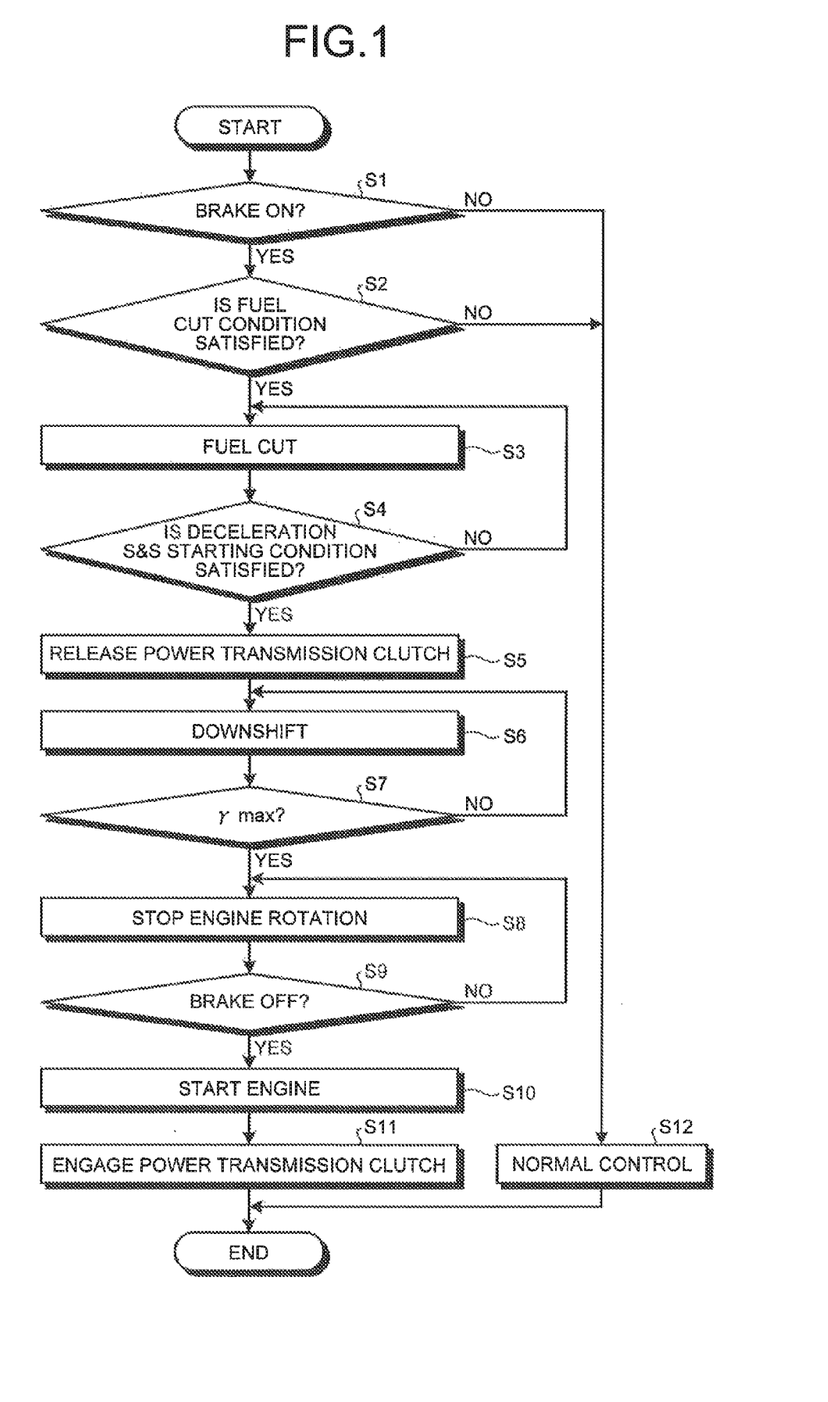
FIG. 1 is a flowchart illustrating operation of an embodiment.
Figure 2:
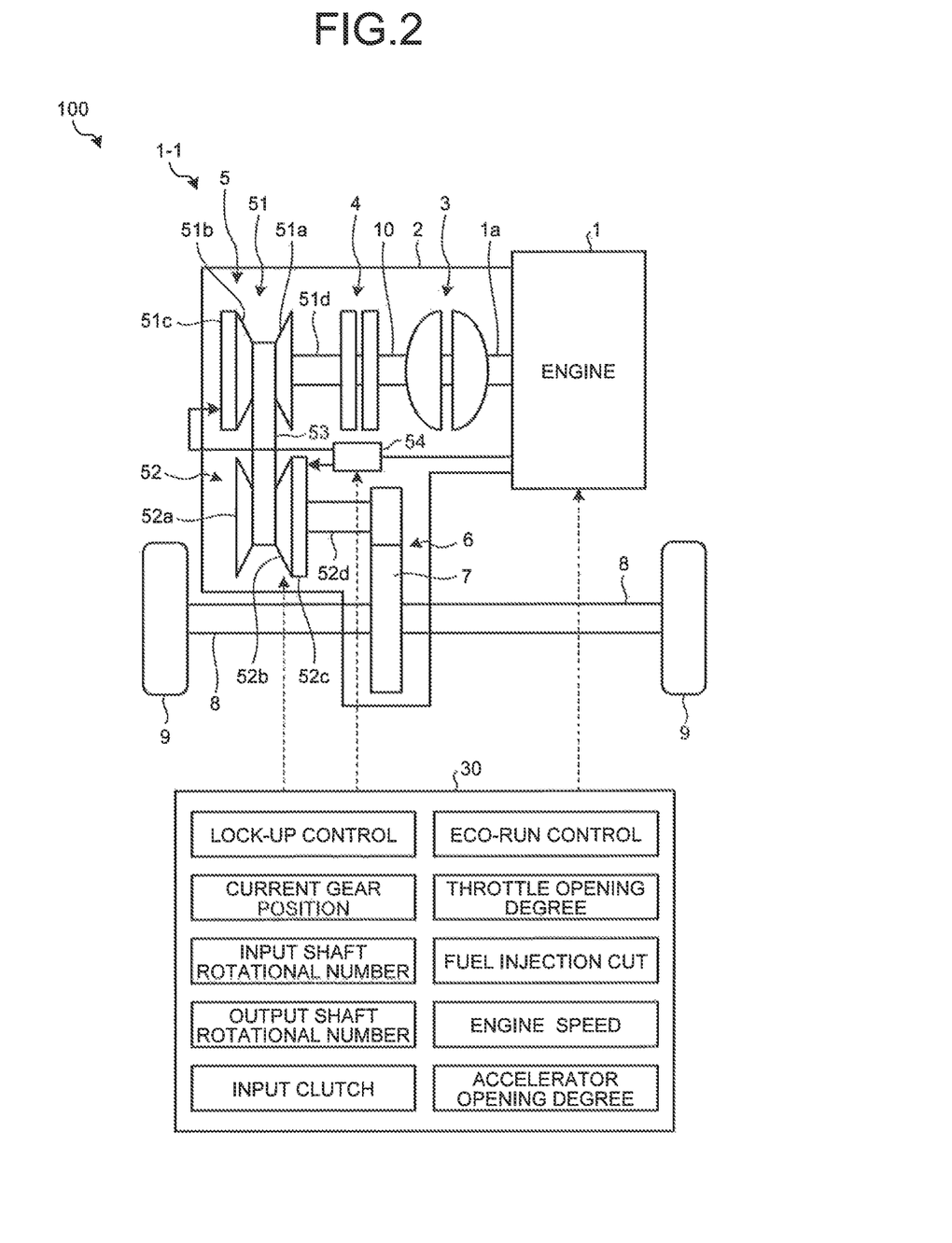
FIG. 2 is a view illustrating a schematic configuration of a vehicle according to the embodiment.
Figure 3:
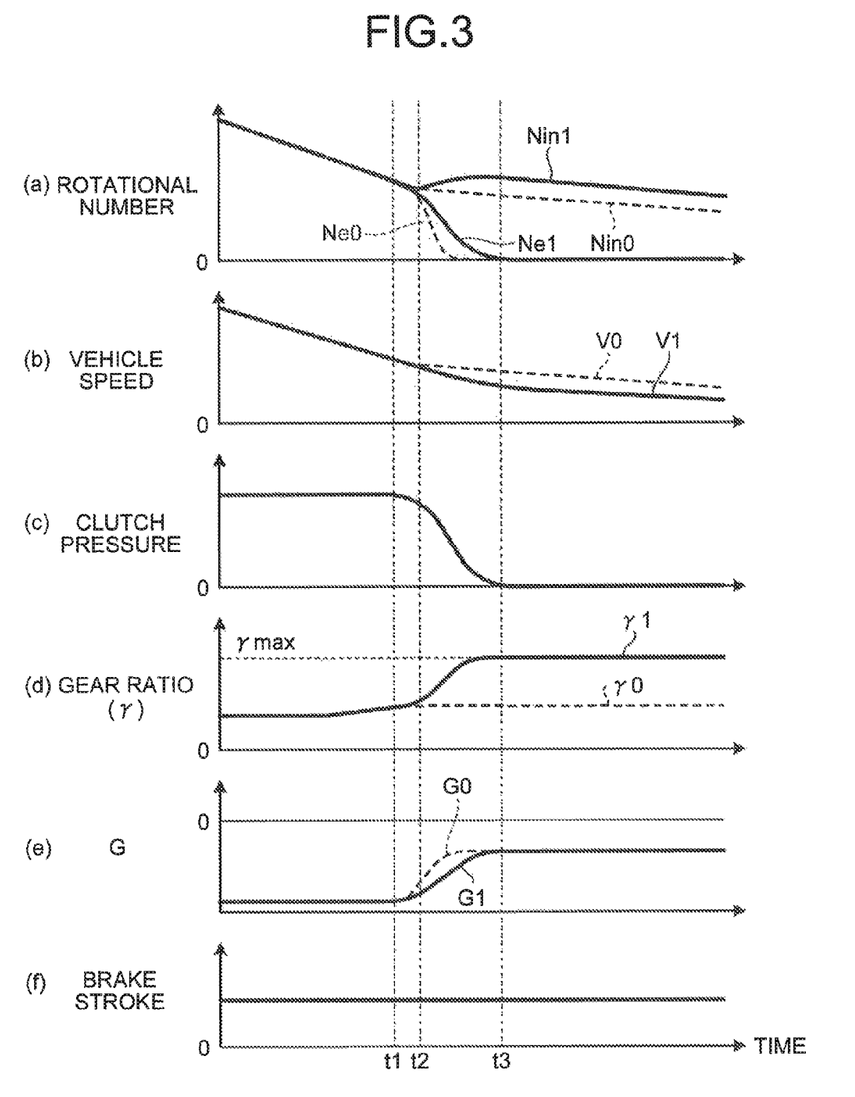
FIG. 3 is a timing chart explaining control by the vehicle control device of the embodiment.

An embodiment is described with reference to FIGS. 1 to 3. This embodiment relates to a vehicle control device. FIG. 1 is a flowchart illustrating operation of this embodiment, FIG. 2 is a view illustrating a schematic configuration of a vehicle according to this embodiment, and FIG. 3 is a timing chart explaining control by the vehicle control device of this embodiment.

The vehicle of this embodiment is capable of executing deceleration S&S control to automatically stop and automatically restart an engine (refer to reference sign 1 in FIG. 2) during deceleration. In the deceleration S&S control, a power transmission clutch (refer to reference sign 4 in FIG.

2) is released. The vehicle control device (refer to reference sign 1-1 in FIG. 2) of this embodiment executes downshift when the power transmission clutch 4 is released and controls a downshift speed such that change in the deceleration becomes small, thereby preventing deceleration failure due to the release of the power transmission clutch 4.

Further, the vehicle control device 1-1 sets the downshift speed such that it is shifted into a maximum gear ratio γmax before engine rotation stops in the downshift when the power transmission clutch 4 is disengaged. According to this, need for return to the maximum gear ratio γmax using an electric oil pump and the like during the deceleration S&S control in preparation for a next start is eliminated. Therefore, it becomes possible to ensure restarting performance without consuming excessive power.

This embodiment is based on a following vehicle.
(1) A vehicular transmission is provided.
(2) An eco-run function capable of stopping/restarting the engine under a predetermined condition is provided.
(3) An input clutch of the transmission is hydraulically or electromagnetically switched and can be operated to be engaged/disengaged.
(4) An automatic transmission equipped with a lock-up mechanism is provided.

As illustrated in FIG. 2, a vehicle 100 is provided with the engine 1, a power transmission mechanism 2, and an ECU 30. The power transmission mechanism 2 includes a torque converter 3, the power transmission clutch 4, a continuously variable transmission 5, a deceleration device 6, and a differential mechanism 7. The power transmission mechanism 2 can shift gears for power output from the engine 1 to transmit to a drive wheel 9. The vehicle control device 1-1 of this embodiment is provided with the engine 1, the power transmission clutch 4, the continuously variable transmission 5, and the ECU 30.

The engine 1 is a power source of the vehicle 100. The engine 1 converts combustion energy from fuel to the power to rotate an output shaft 1a to output. The power output to the output shaft 1a is input to the torque converter 3.

The torque converter 3 is a kind of a fluid clutch including a fluid transmission mechanism and a lock-up clutch. Specifically, the torque converter 3 includes a pump impeller coupled to the output shaft 1a of the engine 1, a turbine runner coupled to the power transmission clutch 4 through an input shaft 10, and working fluid as the fluid transmission mechanism. The torque converter 3 can transmit the power between the pump impeller and the turbine runner through the working fluid. The torque converter 3 also includes a stator, which amplifies the power to be transmitted from the pump impeller to the turbine runner. The torque converter 3 can directly transmit the power from the engine 1 to the power transmission clutch 4 without the working fluid by putting the lock-up clutch into an engaged state.

The power transmission clutch 4 is the input clutch, which connects or blocks the transmission of the power between the torque converter 3 and the continuously variable transmission 5. In the power transmission clutch 4, an engaging member on an input side is connected to the input shaft 10 and an engaging member on an output side is connected to a primary shaft 51d of the continuously variable transmission 5 to be described. The power transmission clutch 4 is a frictionally-engaging clutch device, which can be switched between an engaged state and a released state. Engagement/disengagement (release) of the power transmission clutch 4 can be operated by a hydraulic pressure, an electromagnetic force or another force, for example. Meanwhile, the power transmission clutch 4 can be operated regardless of whether the engine 1 is operated or stopped. For example, when the power transmission clutch 4 is operated by a hydraulic actuator, this can be supplied with the hydraulic pressure by the electric oil pump.

In the engaged state in which the power transmission clutch 4 is engaged, the output of the engine 1 is transmitted to the drive wheel 9 through the torque converter 3, the power transmission clutch 4, and the continuously variable transmission 5. That is to say, the transmission of the power between the engine 1 and the drive wheel 9 is connected. On the other hand, in the released state in which the power transmission clutch 4 is released, the transmission of the power between the engine 1 and the drive wheel 9 is blocked, so that the power cannot be transmitted between the engine 1 and the drive wheel 9. That is to say, the power transmission clutch 4 is the clutch capable of connecting or blocking the transmission of the power between the engine 1 and the drive wheel 9 through the continuously variable transmission 5.

The power transmission clutch 4 can be switched between the engaged state and the released state and it is also possible to optionally control a degree of engagement in the engaged state. That is to say, the power transmission clutch 4 can be put into a fully-engaged state, a semi-engaged state, or the released state. The fully-engaged state is the engaged state in which the engaging member on the input side and the engaging member on the output side of the power transmission clutch 4 engage with each other and both of them integrally rotate. The semi-engaged state is the state in which the engaging member on the input side and the engaging member on the output side of the power transmission clutch 4 engage with each other and the engaging member on the input side and the engaging member on the output side rotate relative to each other. It is possible to control the power transmission clutch 4 to realize the engaged state with an optional slip ratio and an optional slip amount by controlling an engaging pressure (clutch pressure) by the actuator.

The continuously variable transmission 5 is the transmission, which connects the engine 1 to the drive wheel 9 of the vehicle 100. The continuously variable transmission 5 of this embodiment is a belt-type continuously variable transmission. The continuously variable transmission 5 changes a rotational speed (rotational number) of rotation input through the power transmission clutch 4 to a desired rotational speed (rotational number) to output. The continuously variable transmission 5 includes a primary pulley 51, a secondary pulley 52, a belt 53, and a hydraulic control device 54.

The primary pulley 51 includes a primary fixed sheave 51a, a primary movable sheave 51b, a primary hydraulic chamber 51c, and the primary shaft 51d. The primary shaft 51d is arranged coaxially with the input shaft 10. The primary shaft 51d is connected to the input shaft 10 through the power transmission clutch 4. The primary fixed sheave 51a is coupled to the primary shaft 51d so as not to be relatively movable in a shaft direction and so as not to be relatively rotatable. The primary fixed sheave 51a is integrally formed with the primary shaft 51d, for example. The primary movable sheave 51b is attached to the primary shaft 51d so as to be relatively movable in the shaft direction and so as not to be relatively rotatable.

A substantially V-shaped primary groove is formed between the primary fixed sheave 51a and the primary movable sheave 51b. The primary movable sheave 51b slides on the primary shaft 51d in the shaft direction, thereby changing a distance between the primary fixed sheave 51a and the primary movable sheave 51b in the shaft direction.

A configuration of the secondary pulley 52 can be similar to the configuration of the primary pulley 51. The secondary pulley 52 includes a secondary fixed sheave 52a, a secondary movable sheave 52b, a secondary hydraulic chamber 52c, and a secondary shaft 52d. The secondary shaft 52d is arranged so as to be parallel to the primary shaft 51d. The secondary fixed sheave 52a is coupled to the secondary shaft 52d so as not to be relatively movable in the shaft direction and so as not to be relatively rotatable. The secondary movable sheave 52b is attached to the secondary shaft 52d so as to be relatively movable in the shaft direction and so as not to be relatively rotatable.

A substantially V-shaped secondary groove is formed between the secondary fixed sheave 52a and the secondary movable sheave 52b. The secondary movable sheave 52b slides on the secondary shaft 52d in the shaft direction, thereby changing a distance between the secondary fixed sheave 52a and the secondary movable sheave 52b in the shaft direction.

The belt 53 is wound on the primary groove and the secondary groove. The belt 53 is a metal endless belt, for example. The belt 53 transmits rotation between the primary pulley 51 and the secondary pulley 52. A gear ratio γ of the continuously variable transmission 5 is obtained by dividing the rotational speed of the primary shaft 51d, which is an input shaft, by the rotational speed of the secondary shaft 52d, which is an output shaft. That is to say, the gear ratio γ corresponds to a rotational speed ratio between the primary shaft 51d and the secondary shaft 52d.

The primary hydraulic chamber 51c is formed on a side opposite to the primary fixed sheave 51a across the primary movable sheave 51b. The primary hydraulic chamber 51c allows a pressing force to act on the primary movable sheave 51b in a direction toward the primary fixed sheave 51a by the hydraulic pressure supplied to the primary hydraulic chamber 51c. The primary movable sheave 51b is pressed toward the primary fixed sheave 51a along the primary shaft 51d by the pressing force. That is to say, the primary hydraulic chamber 51c can allow a belt pinching force to act on the belt 53 wound on the primary groove through the primary movable sheave 51b.

When the primary movable sheave 51b is moved by the hydraulic pressure of the primary hydraulic chamber 51c and the distance between the primary movable sheave 51b and the primary fixed sheave 51a changes, the distance between the secondary fixed sheave 52a and the secondary movable sheave 52b of the secondary pulley 52 also changes to keep a tensile force of the belt 53 constant. According to this, a contact radius of the belt 53 to the primary pulley 51 and the contact radius of the belt 53 to the secondary pulley 52 change. In this manner, the continuously variable transmission 5 can continuously change the gear ratio by the hydraulic pressure supplied to the primary hydraulic chamber 51c.

The secondary hydraulic chamber 52c is formed on a side opposite to the secondary fixed sheave 52a across the secondary movable sheave 52b. The secondary hydraulic chamber 52c allows the pressing force to act on the secondary movable sheave 52b in a direction toward the secondary fixed sheave 52a by the hydraulic pressure supplied to the secondary hydraulic chamber 52c. By the pressing force, the secondary movable sheave 52b is pressed in the direction toward the secondary fixed sheave 52a along the secondary shaft 52d. That is to say, the secondary hydraulic chamber 52c can allow the belt pinching force to act on the belt 53 wound on the secondary groove through the secondary movable sheave 52b.

The hydraulic control device 54 controls supply of the working fluid to the primary hydraulic chamber 51c and the secondary hydraulic chamber 52c. The hydraulic control device 54 can control the hydraulic pressure and a supply flow amount of the working fluid to be supplied to the primary hydraulic chamber 51c and a discharge flow amount of the working fluid from the primary hydraulic chamber 51c. That is to say, the hydraulic control device 54 can control the gear ratio γ and a shift speed of the continuously variable transmission 5 by adjusting the supply of the hydraulic pressure to the primary hydraulic chamber 51c. Herein, the shift speed is a moving speed of the primary movable sheave 51b toward the primary fixed sheave 51a in the shaft direction and a changing speed of the gear ratio γ of the continuously variable transmission 5. The hydraulic control device 54 can control an upshift speed being the shift speed at which the gear ratio γ of the continuously variable transmission 5 is shifted into a high-speed side gear ratio and a downshift speed being the shift speed at which the gear ratio γ of the continuously variable transmission 5 is shifted into a low-speed side gear ratio.

The hydraulic control device 54 can control the hydraulic pressure and the supply flow amount of the working fluid to be supplied to the secondary hydraulic chamber 52c and the discharge flow amount of the working fluid from the secondary hydraulic chamber 52c. According to this, the hydraulic control device 54 can control the belt pinching force.

The hydraulic pressure is supplied from the oil pump driven by the power of the engine 1 to the hydraulic control device 54. In this description, the oil pump driven by the power of the engine 1 is referred to as an "engine oil pump". The hydraulic control device 54 adjusts the hydraulic pressure supplied from the engine oil pump and supplies the same to the primary hydraulic chamber 51c and the secondary hydraulic chamber 52c.

The deceleration device 6 connects the secondary shaft 52d to the differential mechanism 7. The deceleration device 6 is obtained by combining a plurality of gears, for example, and this decelerates the rotation of the secondary shaft 52d to transmit to the differential mechanism 7.

The differential mechanism 7 connects the deceleration device 6 to a drive shaft 8. The power input through the deceleration device 6 to be output from the differential mechanism 7 is transmitted to the drive wheel 9 through the drive shaft 8. The differential mechanism 7 absorbs a difference in rotational speed between right and left drive wheels 9 and 9 when the vehicle 100 turns.

The power output from the engine 1 is transmitted to the drive wheel 9 through the torque converter 3, the power transmission clutch 4, the continuously variable transmission 5, the deceleration device 6, the differential mechanism 7, and the drive shaft 8 to rotate the drive wheel 9 and allow the vehicle 100 to travel.

The ECU 30 is an electronic control unit including a computer. The ECU 30 is connected to the engine 1 and the power transmission mechanism 2 to control the engine 1 and the power transmission mechanism 2. Specifically, the ECU 30 can perform control of a throttle opening degree of the engine 1, fuel control including control of an injection amount and injection timing of the fuel, ignition control, a starting control by a starter and the like.

The ECU 30 can also perform lock-up control to switch between release and engagement of the lock-up clutch of the torque converter 3, control of the power transmission clutch 4 including the switch between the release and the engagement of the power transmission clutch 4 and the control of the degree of engagement, control of the gear ratio, the shift speed, and the belt pinching force of the continuously variable transmission 5 by the hydraulic control device 54 and the like as the control for the power transmission mechanism 2.

A signal from a sensor, which detects a state of each unit of the vehicle, is input to the ECU 30. For example, a sensor, which detects an opening degree of a throttle valve, a sensor, which detects an engine speed, a sensor, which detects an accelerator opening degree, and the like are connected to the ECU 30, and a signal indicating a detection result of each sensor is input to the ECU 30. A shift position sensor, which detects a gear position currently selected by a shift lever, is connected to the ECU 30 and a signal indicating a detection result of the shift position sensor is input to the ECU 30.

An input shaft rotational speed sensor, which detects an input rotational number Nin being the rotational number of the primary shaft 51d, and an output shaft rotational number sensor, which detects an output rotational number Nout being the rotational number of the secondary shaft 52d, are connected to the ECU 30 and signals indicating the detected input rotational number Nin and output rotational number Nout are input to the ECU 30. A brake switch, which detects whether depression operation to a brake pedal is performed, is connected to the ECU 30 and a signal indicating a detection result of the brake switch is input to the ECU 30. The brake switch outputs the signal indicating that the brake is on when a depression amount on the brake pedal is not smaller than a certain amount, for example. Meanwhile, the ECU 30 is also connected to a brake operation amount sensor, which detects a pedal stroke of the brake pedal, and is capable of obtaining whether it is in a brake-on state based on a detection result of the brake operation amount sensor.

The ECU 30 can execute the lock-up control. The ECU 30 controls the lock-up clutch of the torque converter 3 based on the throttle opening degree and a vehicle speed, for example. The ECU 30 stores a map in which a region in which the lock-up clutch is engaged is determined using the throttle opening degree and the vehicle speed as variables in advance and engages or releases the lock-up clutch based on the map.

The ECU 30 can also execute eco-run control. The eco-run control automatically stops and restarts the engine 1. The eco-run control is executed during the travel of the vehicle 100, for example. The ECU 30 automatically stops the engine 1 when a condition for stopping the engine 1 is satisfied during the travel. The ECU 30 restarts the engine 1 when a condition for restarting the engine 1 is satisfied while the engine stops during the travel. In this manner, the ECU 30 can execute S&S (automatic stop and start) control to automatically stop and automatically restart the engine 1 during the travel.

The ECU 30 allows the vehicle 100 to travel while putting the power transmission clutch 4 into the released state in the S&S control. The ECU 30 stops supplying the fuel to the engine 1 in a state in which the power transmission clutch 4 is engaged, for example, when executing the S&S control. According to this, the engine 1 is dragged by the power transmitted from the drive wheel 9 through the power transmission device 2. The ECU 30 releases the power transmission clutch 4 in a state in which the supply of the fuel to the engine 1 is stopped. When the power transmission clutch 4 is released, the transmission of the power between the engine 1 and the drive wheel 9 is blocked, and engine braking does not act on the drive wheel 9. That is to say, according to the S&S control, it becomes possible to realize a fuel economy improving effect by decreasing travel resistance in addition to the fuel economy improving effect by stopping the supply of the fuel to the engine 1.

The S&S control of this embodiment is predetermined control to allow the vehicle 100 to travel while stopping supplying the fuel to the engine 1 and releasing the power transmission clutch 4, which has been engaged, during the travel. Meanwhile, in the S&S control, relationship between timing to stop the supply of the fuel to the engine 1 and timing to release the power transmission clutch 4 is not limited to the above. That is to say, it is possible that the timing to stop the supply of the fuel to the engine 1 and the timing to release the power transmission clutch 4 coincide with each other or it is possible to stop supplying the fuel to the engine 1 after the power transmission clutch 4 is released.

The ECU 30 can execute the deceleration S&S control to automatically stop and automatically restart the engine 1 during the deceleration of the vehicle 100. The deceleration S&S control is executed when the driver performs brake operation, that is to say, when the brake is on, for example. In this description, the S&S control executed when the brake is on is referred to as the deceleration S&S control and the S&S control executed when the brake is off is referred to as "free-run S&S control".

Herein, in the S&S control including the deceleration S&S control and the free-run S&S control, there is a case in which the deceleration failure occurs at the time the power transmission clutch 4 is released. The engine braking does not act due to the release of the power transmission clutch 4 and a load acting on the drive wheel 9 decreases, so that the deceleration drastically decreases and the driver might feel uncomfortable. For example, in the deceleration S&S control, actual deceleration is different from the deceleration intended by the driver who performs braking operation and the driver might feel uncomfortable.

On the other hand, if the vehicle 100 is allowed to travel with the engine 1 stopped and without the power transmission clutch 4 released, the uncomfortable feeling due to deceleration fluctuation may be inhibited; however, the speed easily decreases due to increase in travel resistance, so that fuel economy for reacceleration and the like increases. In this manner, although it is advantageous to release the power transmission clutch 4 to decrease the deceleration in view of fuel economy improvement, it is desirable to inhibit the decrease in the deceleration at the time the power transmission clutch 4 is released in view of drivability. When the power transmission clutch 4 as the input clutch is released in a slipping manner in order to inhibit the change in the deceleration, a load on the power transmission clutch 4 becomes larger as a temperature of the power transmission clutch 4 increases.

The vehicle control device 1-1 of this embodiment downshifts the continuously variable transmission 5 at the time the power transmission clutch 4 is released in the S&S control. By downshifting, it is possible to cancel the deceleration failure due to the release of the power transmission clutch 4 by a feeling of being drawn of the deceleration at the time of the downshift. Therefore, according to the vehicle control device 1-1 of this embodiment, it is possible to inhibit the decrease in the deceleration when the engine 1 is stopped and the power transmission clutch 4 is released during the travel of the vehicle 100. Meanwhile, in this description, the downshift control performed at the time the power transmission clutch 4 is released of the S&S control is also referred to as "released-period downshift control".

A case in which the deceleration S&S control is performed is described as an example of the operation of this embodiment with reference to FIGS. 1 and 3. In FIG. 3, (a) illustrates rotational numbers, (b) illustrates the vehicle speed of the vehicle 100, (c) illustrates the clutch pressure of the power transmission clutch 4, (d) illustrates the gear ratio of the continuously variable transmission 5, (e) illustrates acceleration of the vehicle 100, and (f) illustrates a brake stroke. Reference signs Ne0 and Nin0 represent the engine speed and the input rotational number, respectively, in a case in which the released-period downshift control of this embodiment is not performed. Reference signs Ne1 and Nin1 represent the engine speed and the input rotational number in a case in which the released-period downshift control is performed.

Reference signs V0, γ0, and G0 represent the vehicle speed, the gear ratio, and the acceleration, respectively, in the case in which the released-period downshift control is not performed. Reference signs V1, γ1, and G1 represent the vehicle speed, the gear ratio, and the acceleration, respectively, in the case in which the released-period downshift control is performed. In the timing chart in FIG. 3, the braking operation is performed at a constant brake stroke at the time of the deceleration. FIG. 3 illustrates the timing chart when the S&S control is performed in a lock-up on state in which the lock-up clutch of the torque converter 3 is engaged and the engine speed is the same as a turbine rotational number.

A control flow illustrated in FIG. 1, which is executed during the travel of the vehicle 100, is repeatedly executed at a predetermined interval, for example.

First, the ECU 30 judges whether the brake is on at step S1. The ECU 30 performs the judgment at step S1 based on the detection result of the brake switch, for example. As a result of the judgment, when it is judged that the brake is on (Y at step S1), the procedure shifts to step S2, otherwise (N at step S1), the procedure shifts to step S12.

At step S2, the ECU 30 judges whether a fuel cut condition is satisfied. The ECU 30 judges whether the fuel cut condition for stopping supplying the fuel to the engine 1 is satisfied. The ECU 30 can perform the judgment at step S2 based on the accelerator opening degree and the vehicle speed, for example. As an example, the ECU 30 may judge that the fuel cut condition is satisfied when the accelerator is off and the vehicle speed is not lower than a predetermined vehicle speed set in advance. As a result of the judgment at step S2, when it is judged that the fuel cut condition is satisfied (Y at step S2), the procedure shifts to step S3, otherwise (N at step S2), the procedure shifts to step S12.

At step S3, the ECU 30 executes fuel cut. The ECU 30 outputs an instruction to stop supplying the fuel to the engine 1. When step S3 is executed, the procedure shifts to step S4.

At step S4, the ECU 30 judges whether a condition for starting the deceleration S&S control is satisfied. The ECU 30 performs the judgment at step S4 based on the condition for starting the deceleration S&S control determined in advance. The condition for starting the deceleration S&S control is a condition regarding a state of charge of a battery, for example. For example, when an amount of charge of the battery is appropriate, the deceleration S&S control is permitted. On the other hand, when an amount of charge of the battery is low, the execution of the deceleration S&S control is forbidden such that the rotation of the engine 1 is maintained and an alternator is allowed to generate the power to charge the battery.

When it is judged that the condition for starting the deceleration S&S control is satisfied as a result of the judgment at step S4 (Y at step S4), the procedure shifts to step S5, otherwise (N at step S4), the procedure shifts to step S3 and the fuel cut is continued. In FIG. 3, it is judged that the condition for starting the deceleration S&S control is satisfied after time t1.

At step S5, the ECU 30 releases the power transmission clutch 4. The ECU 30 instructs the actuator of the power transmission clutch 4 to decrease the clutch pressure (fastening hydraulic pressure) to the hydraulic pressure at which the power transmission clutch 4 is released so as to release the power transmission clutch 4, which is in the engaged state. Meanwhile, a releasing speed at which the power transmission clutch 4 is released, that is to say, a changing speed of the clutch pressure supplied to the power transmission clutch 4 may be variable according to a travel condition and the like. It is possible to control the changing speed of the clutch pressure by adjusting a flow amount of the working fluid supplied to the power transmission clutch 4 and the flow amount of the working fluid discharged from the power transmission clutch 4, for example. When step S5 is executed, the procedure shifts to step S6. In FIG. 3, a release instruction to the power transmission clutch 4 is started to be output at time t1.

The clutch pressure of the power transmission clutch 4 starts decreasing after time t1 by the release instruction to the power transmission clutch 4 by the ECU 30 and the clutch pressure is fully released to reach 0 at time t3. If the released-period downshift control is not performed when the clutch pressure decreases, the engine speed Ne0 drastically decreases as illustrated in FIG. 3. That is to say, the load on the drive wheel 9 by the engine 1, in other words, an engine braking force drastically decreases. The acceleration G0 drastically increases in response to the decrease in the engine braking force. That is to say, the "deceleration failure" in which the deceleration decreases occurs.

The ECU 30 executes the downshift at step 36. The ECU 30 starts downshifting the continuously variable transmission 5 by start of an instruction to decrease the hydraulic pressure to the power transmission clutch 4 as a trigger, for example. That is to say, the downshift is started in synchronization with the release instruction to release the power transmission clutch 4. According to this, it becomes possible to overlap a release period from the output of the release instruction to actual release of the power transmission clutch 4 with a downshift period. The downshift speed at that time is set to a speed at which the change in the deceleration of the vehicle 100 when the power transmission clutch 4 is released may be decreased. That is to say, the ECU 30 controls the downshift speed such that the changing speed and a degree of change of the deceleration of the vehicle 100 decrease by the downshift of the continuously variable transmission 5 as compared to a case in which the downshift is not performed.

The ECU 30 sets the downshift speed based on the releasing speed of the power transmission clutch 4, for example. As an example, when the releasing speed of the power transmission clutch 4 is high, the ECU 30 increases the downshift speed of the continuously variable transmission 5 as compared to a case in which the releasing speed is low. In this manner, it is possible to appropriately set the downshift speed according to a degree of the deceleration failure occurring when the power transmission clutch 4 is released. By making the downshift speed higher as the degree of the deceleration failure by the release of the power transmission clutch 4 becomes larger, the feeling of being drawn the deceleration at the time of the downshift increases, so that the deceleration failure can be appropriately canceled.

The ECU 30 may also set the downshift speed according to the period up to the release of the power transmission clutch 4. By setting the downshift speed according to the period up to the release of the power transmission clutch 4, it is possible to adjust a rate of a period overlapped with the downshift period in the period up to the release of the power transmission clutch 4. As an example, the ECU 30 sets the downshift speed such that the rate of the period overlapped with the period of the downshift in the period from the output of the release instruction to the power transmission clutch 4 up to the release of the power transmission clutch 4 (from time t1 to t3) becomes larger.

The ECU 30 sets the downshift speed such that the downshift can be completed by time t3 at which the power transmission clutch 4 is released, for example. Preferably, the downshift speed is set such that the timing at which the power transmission clutch 4 is released and timing at which the downshift is completed synchronize with each other. When the timing at which the power transmission clutch 4 is released and the timing at which the downshift is completed are synchronized with each other, it is possible to allow timing at which the deceleration fluctuation associated with the release of the power transmission clutch 4 finishes and timing at which the deceleration fluctuation at the time of the downshift finishes to coincide with each other. Meanwhile, the timing at which the power transmission clutch 4 is released is timing at which the power transmission clutch 4 is switched from the engaged state to the released state and timing at which a state in which the power is connected is switched to a state in which the power transmission is blocked in the power transmission clutch 4.

In this embodiment, shift control to change the gear ratio γ1 to the maximum gear ratio γmax is performed in the released-period downshift control. That is to say, the ECU 30 sets the downshift speed such that the shift into the maximum gear ratio γmax is completed by the time the power transmission clutch 4 is completely released. The ECU 30 may also store a map of the downshift speed at which the gear ratio γ1 may be changed to the maximum gear ratio γmax in the released-period downshift control, for example. This map can be the map in which the gear ratio and the vehicle speed when the released-period downshift control is started, the releasing speed of the power transmission clutch 4 and the like are used as variables, for example.

The ECU 30 may also set the downshift speed based on the acceleration G1 of the vehicle 100 when the instruction to decrease the hydraulic pressure to the power transmission clutch 4 is started and transition of the acceleration G1 of the vehicle 100 before the instruction to decrease the hydraulic pressure is started, for example. The ECU 30 instructs the hydraulic control device 54 to downshift at the set downshift speed. The hydraulic control device 54 controls the supply and the discharge of the hydraulic pressure to and from the primary hydraulic chamber 51c and the secondary hydraulic chamber 52c so as to downshift the continuously variable transmission 5 at the instructed downshift speed. When step S6 is executed, the procedure shifts to step S7.

In this embodiment, the released-period downshift control is performed and the gear ratio γ1 starts increasing from time t1, so that the engine speed Ne1 is inhibited from decreasing. By the downshift, the input rotational number Nin1 is higher than the input rotational number Nin0 in the case in which the released-period downshift control is not performed. The rotation of the primary shaft 51d is transmitted to the output shaft 1a of the engine 1 through the power transmission clutch 4 and the torque converter 3, so that the engine speed Ne1 is inhibited from decreasing by the downshift.

In this manner, a decrease speed of the engine speed Ne1 in the case in which the released-period downshift control is performed is lower than the decrease speed of the engine speed Ne0 in the case in which the released-period downshift control is not performed. Increase in the engine speed Ne1 by the downshift (inhibition of the decrease in the engine speed Ne1) generates the feeling of being drawn of the deceleration at the time of the downshift at the same time. That is to say, change in the acceleration G1 in the case in which the released-period downshift control is performed is slower than change in the acceleration G0 in the case in which the released-period downshift control is not performed. The decrease in the deceleration by the release of the power transmission clutch 4 is cancelled by the feeling of being drawn of the deceleration by the downshift and the decrease in the deceleration is inhibited. According to this, the driver is inhibited from feeling uncomfortable by the deceleration failure.

At step S7, the ECU 30 judges whether the gear ratio of the continuously variable transmission 5 is the maximum gear ratio γmax. The ECU 30 can calculate a current gear ratio γ based on the input rotational number Nin and the output rotational number Nout, for example. As a result of the judgment at step S7, when it is judged that the current gear ratio of the continuously variable transmission 5 is the maximum gear ratio γmax (Y at step S7), the procedure shifts to step S8, otherwise (N at step S7), the procedure shifts to step S6 to continue the downshift. In FIG. 3, the gear ratio γ1 reaches the maximum gear ratio γmax by time t3 at which the clutch pressure reaches 0 and the released-period downshift control is finished.

At step S8, the ECU 30 stops the engine rotation. The ECU 30 stops the rotation of the engine 1 by performing the fuel cut. When step S8 is executed, the procedure shifts to step S9.

The ECU 30 judges whether the brake is off at step S9. The ECU 30 performs the judgment at step S9 based on the detection result of the brake switch, for example. As a result of the judgment, when it is judged that the brake is off (Y at step S9), the procedure shifts to step S10, otherwise (N at step S9), the procedure shifts to step S8 to maintain a state in which the rotation of the engine 1 is stopped.

At step S10, the ECU 30 starts the engine 1. The ECU 30 allows the starter to rotate the engine 1, thereby restarting the engine 1. When step S10 is executed and the engine 1 is restarted, the procedure shifts to step S11.

At step S11, the ECU 30 engages the power transmission clutch 4. When the power transmission clutch 4 is put into the engaged state, the deceleration S&S control is finished and it becomes possible to travel while transmitting the power of the engine 1 to the drive wheel 9. When step S1 is executed, this control flow is finished.

The ECU 30 executes normal control at step S12. The ECU 30 allows the vehicle 100 to travel while putting the engine 1 in an operating state and putting the power transmission clutch 4 in the engaged state. When step S12 is executed, this control flow is finished.

According to the vehicle control device 1-1 of this embodiment, it is possible to make the change in the acceleration G1 slower than the change in the acceleration G0 when the released-period downshift control is not performed by performing the released-period downshift control. That is to say, the vehicle control device 1-1 of this embodiment can inhibit the decrease in the deceleration when the engine 1 is stopped and the power transmission clutch 4 is released during the travel of the vehicle 100, in other words, the change in the acceleration to accelerate when the power transmission clutch 4 is released. Since the decrease in the deceleration is inhibited, the driver is inhibited from feeling uncomfortable when the power transmission clutch 4 is released when the S&S control is started.

Since the decrease in the deceleration is inhibited, the vehicle speed V1 when the released-period downshift control is performed becomes lower than the vehicle speed V0 when the released-period downshift control is not performed. When the released-period downshift control is not performed, inclination of the vehicle speed V0 changes at time t2 from the inclination of the same before time t2 by the deceleration failure associated with the release of the power transmission clutch 4. On the other hand, in this embodiment, since the released-period downshift control is performed, the change in the inclination of the vehicle speed V1 due to the release of the power transmission clutch 4 is inhibited. It is possible to decrease the vehicle speed V1 also after time t2 along the inclination of the vehicle speed V1 before time t2.

Meanwhile, the released-period downshift control can be performed not only when the deceleration S&S control is executed but also when the S&S control including the free-run S&S control is executed. Herein, the deceleration S&S control is started according to the brake-on state, that is to say, the braking operation. Therefore, when the released-period down shift control is performed in the deceleration S&S control, it is possible to inhibit the deceleration failure at the time of braking, so that this is especially effective in inhibiting the driver from feeling uncomfortable.

The vehicle control device 1-1 of this embodiment changes the gear ratio $\gamma 1$ to the maximum gear ratio $\gamma max$ by the time the rotation of the engine 1 stops at the time the power transmission clutch 4 is released in the released-period downshift control. That is to say, the vehicle control device 1-1 sets the downshift speed of the released-period downshift control so as to shift the gear ratio $\gamma 1$ of the continuously variable transmission 5 into a lowest-speed side gear ratio by the time the engine speed Ne1 reaches 0. According to this, it is possible to ensure the restarting performance without decrease in fuel economy as described later.

When the rotation of the engine 1 is stopped by the S&S control, the engine oil pump also stops, so that the engine oil pump cannot supply the hydraulic pressure to shift gears of the continuously variable transmission 5. That is to say, the gear ratio $\gamma$ of the continuously variable transmission 5 is the same as the gear ratio at the time when the rotation of the engine 1 stops. Herein, it is preferable to change the gear ratio $\gamma$ of the continuously variable transmission 5 to the maximum gear ratio $\gamma max$ by the next start in order to improve the restarting performance after the stop. Then, the electric oil pump might be provided to shift the continuously variable transmission 5 into the maximum gear ratio $\gamma max$ while the S&S control is executed by the hydraulic pressure supplied by the electric oil pump, for example.

However, when the electric oil pump is driven to shift gears of the continuously variable transmission 5, power consumption leads to the decrease in the fuel economy. It is possible to downshift into the maximum gear ratio $\gamma max$ before the S&S control is started instead of downshifting while the S&S control is executed so as to change the gear ratio $\gamma$ to the maximum gear ratio $\gamma max$ without consuming the power. However, in this case, the driver might feel uncomfortable by increase in the deceleration.

When the released-period downshift control is executed and it is downshifted at the downshift speed at which the gear ratio $\gamma$ of the continuously variable transmission 5 may be changed to the maximum gear ratio $\gamma max$ by the time the rotation of the engine 1 stops as in this embodiment, it becomes possible to set the gear ratio of the continuously variable transmission 5 to the maximum gear ratio $\gamma max$ at a time point at which the rotation of the engine 1 stops. Therefore, it is possible to directly start the travel in the maximum gear ratio $\gamma max$ at the next start, so that the restarting performance is improved. It is possible to downshift into the maximum gear ratio $\gamma max$ by the hydraulic pressure supplied by the engine oil pump, so that it is possible to inhibit the decrease in the fuel economy as in a case in which the electric oil pump is driven. Also, it is possible to inhibit excessive deceleration from generating as in a case in which it is downshifted into the maximum gear ratio $\gamma max$ before the S&S control is started by downshifting the continuously variable transmission 5 at the time the power transmission clutch 4 is released.

That is to say, according to this embodiment, it is possible not only to inhibit the deceleration failure at the time the power transmission clutch 4 is released in the S&S control but also to set the gear ratio of the continuously variable transmission 5 to the maximum gear ratio $\gamma max$ in preparation for the next start. Further, it is possible to improve the fuel economy by executing the downshift to set the gear ratio to the maximum gear ratio $\gamma max$ using the rotation of the engine 1.

Meanwhile, when the released-period downshift control is performed in the free-run S&S control, it is possible to judge that the accelerator is off instead of judging that the brake is on at step S1 in FIG. 1, for example, and judge that the accelerator is on instead of judging that the brake is off at step S9.

Although the transmission to downshift in the released-period downshift control is the continuously variable transmission 5 in this embodiment, the transmission is not limited thereto. The transmission provided on the power transmission mechanism 2 may be a stepped automatic transmission, for example. It is possible to cancel the deceleration failure associated with the release of the power transmission clutch 4 by generating drawing of the deceleration by executing the downshift of the stepped transmission at the time the power transmission clutch 4 is released in the S&S control.

Although the released-period downshift control is executed by the release instruction to the power transmission clutch 4 as a trigger condition in this embodiment, start timing of the released-period downshift control is not limited thereto. For example, the released-period downshift control may be started before the release instruction to the power transmission clutch 4 is output. For example, it is possible to output a downshift instruction to the continuously variable transmission 5 before the release instruction to the power transmission clutch 4 is output so as to make the timing at which the downshift is completed desired timing according to the release of the power transmission clutch 4.

Although the timing at which the downshift is completed in the released-period downshift control preferably coincides with the timing at which the power transmission clutch 4 is released, this may be before or after the timing at which the power transmission clutch 4 is released. That is to say, if the period of the downshift by the released-period downshift control is overlapped with at least a part of the period in which the clutch pressure of the power transmission clutch 4 is decreased, the deceleration failure can be inhibited. Also, the larger the rate of the period overlapped with the period of the downshift in the period in which the clutch pressure of the power transmission clutch 4 decreases, the more effectively the deceleration failure can be inhibited.

Although a case in which the clutch to connect or block the transmission of the power between the engine 1 and the drive wheel 9 through the transmission is the power transmission clutch 4 is described as an example in this embodiment, this is not limited thereto. The clutch, which connects or blocks the transmission of the power between the engine 1 and the drive wheel 9 through the transmission, may be arranged not only in a position between the torque converter 3 and the continuously variable transmission 5 but also in any position of a driving system.

Meanwhile, FIG. 3 illustrates the timing chart of a case in which the S&S control is started from the lock-up on state of the torque converter 3, the control is not limited thereto. The S&S control may be performed from any of the lock-up on state or a lock-up off state of the torque converter 3.

The contents disclosed in the above-described embodiment can be appropriately combined to be executed.

INDUSTRIAL APPLICABILITY

As described above, the vehicle control device according to the present invention is suitable for inhibiting the decrease in the deceleration when the engine is stopped and the clutch is released during the travel of the vehicle.

REFERENCE SIGNS LIST

1-1 vehicle control device
1 engine
2 power transmission mechanism
4 power transmission clutch
5 continuously variable transmission
9 drive wheel
30 ECU
54 hydraulic control device
100 vehicle

The invention claimed is:
1. A vehicle control device comprising:
an engine that is a power source of a vehicle;
a transmission configured to connect the engine to a drive wheel of the vehicle; and
a clutch configured to connect transmission of power between the engine and the drive wheel through the transmission when the clutch is engaged or block transmission of power between the engine and the drive wheel when the clutch is disengaged,
wherein the vehicle control device executes a predetermined control including:
performing a fuel cut to stop the supply of fuel to the engine, during travel of the vehicle,
decreasing an engaging pressure of the clutch so as to disengage the clutch that was previously engaged, during travel of the vehicle, and
downshifting the transmission into a lowest-speed side gear ratio control by the time a rotation of the engine stops while decreasing the engaging pressure of the clutch.

2. The vehicle control device according to claim 1, wherein
the predetermined control is started according to a braking operation.

3. The vehicle control device according to claim 1, wherein
the downshift is started simultaneously when a disengage instruction to disengage the clutch is output in the predetermined control.

4. The vehicle control device according to claim 1, wherein
the vehicle control device controls a speed of the downshift which is a changing speed of a gear ratio in the predetermined control.

5. The vehicle control device according to claim 4, wherein
the speed of the downshift in the predetermined control is a speed to decrease change in deceleration of the vehicle at the time the clutch is disengaged.

6. The vehicle control device according to claim 4, wherein
the speed of the downshift in the predetermined control is based on a disengaging speed at which the clutch is disengaged.

7. The vehicle control device according to claim 1, wherein
a timing at which the clutch is completely disengaged and a timing at which the downshift is completed coincide with each other in the predetermined control.

* * * * *